(12) United States Patent
Brockway

(10) Patent No.: US 11,077,534 B2
(45) Date of Patent: Aug. 3, 2021

(54) METHOD FOR RECONDITIONING A COMPACTOR WHEEL

(71) Applicant: Radial Iron Works LLC, Fairchild, WI (US)

(72) Inventor: Robert John Brockway, Fairchild, WI (US)

(73) Assignee: Radial Iron Works LLC, Fairchild, WI (US)

( * ) Notice: Subject to any disclaimer, the term of this patent is extended or adjusted under 35 U.S.C. 154(b) by 388 days.

(21) Appl. No.: 15/614,016

(22) Filed: Jun. 5, 2017

(65) Prior Publication Data

US 2018/0250787 A1 Sep. 6, 2018

Related U.S. Application Data

(60) Provisional application No. 62/465,203, filed on Mar. 1, 2017.

(51) Int. Cl.
*B23P 6/00* (2006.01)
*B24B 5/44* (2006.01)
*B24B 5/36* (2006.01)

(52) U.S. Cl.
CPC ........ *B24B 5/44* (2013.01); *B23P 6/00* (2013.01); *B24B 5/366* (2013.01)

(58) Field of Classification Search
CPC ... B24B 5/44; B24B 5/366; B23P 6/00; B60P 3/14
See application file for complete search history.

(56) References Cited

U.S. PATENT DOCUMENTS

| | | | | |
|---|---|---|---|---|
| 3,822,957 A * | 7/1974 | Caron | ..................... | E02D 3/026 404/121 |
| 2016/0017454 A1* | 1/2016 | Meyer | ................... | C22C 38/002 428/684 |
| 2017/0014901 A1* | 1/2017 | Powell | ................... | B22D 19/16 |

OTHER PUBLICATIONS

"Electroslag strip welding," Konig & Co., Extracts of ESAB Technical Handbook ed. Nov. 2008, http://www.koenig-co.de/index.php?id=209.

* cited by examiner

*Primary Examiner* — Rick K Chang
(74) *Attorney, Agent, or Firm* — Ziolkowski Patent Solutions Group, SC

(57) ABSTRACT

A method for reconditioning a compactor wheel of a compaction machine is provided. The method includes mounting a compactor wheel on a positioning system configured to provide one or more of angular adjustment, vertical and horizontal translation, and rotation of the compactor wheel, so as to position the compactor wheel in a desired position. The method also includes providing a welding system configured to perform a submerged arc strip welding or weld cladding operation on the compactor wheel. The submerged arc strip welding or weld cladding operation is performed on at least one surface or edge of the compactor wheel to add weldable material thereto, so as to recondition the at least one surface or edge of the compactor wheel.

20 Claims, 15 Drawing Sheets

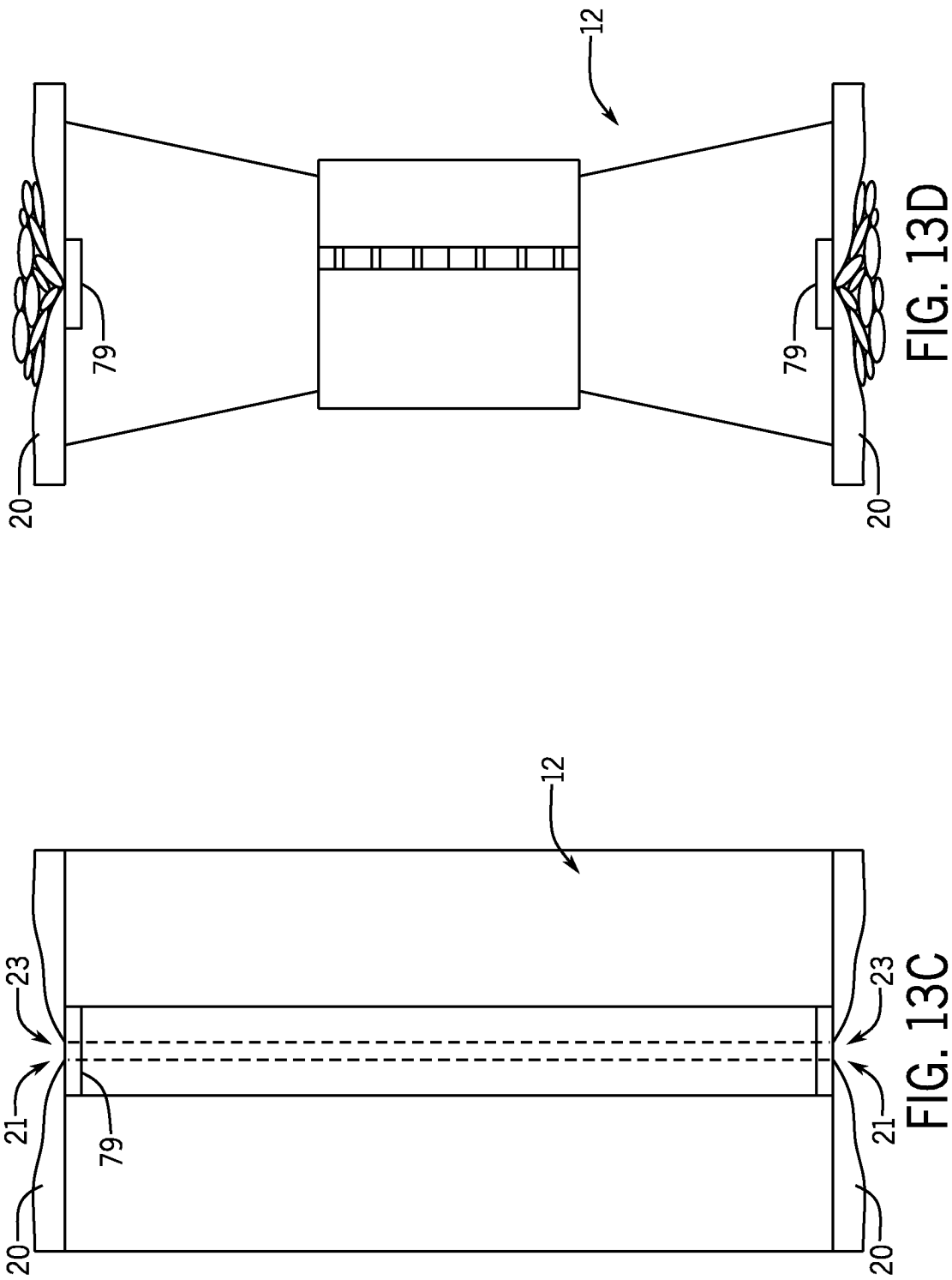

METHOD FOR RECONDITIONING A COMPACTOR WHEEL

CROSS REFERENCE TO RELATED APPLICATION

The present invention is a continuation of and claims priority to U.S. Provisional Patent Application Ser. No. 62/465,203 filed Mar. 1, 2017, the disclosure of which is incorporated herein by reference in its entirety.

BACKGROUND OF THE INVENTION

The invention relates generally to compaction machines, such as those used to compact soil and landfills and, more particularly, to a method for reconditioning the compactor wheels on such a compaction machine.

Compaction machines are used to compact new road beds, construction sites, landfill sites, garbage dumps, and other such locations. These machines typically include a self-propelled vehicle having four large compactor wheels made of steel. Each compactor wheel has a hub mounted to one end of an axle and a rim disposed around and radially out from the hub. The rim typically includes an outer wrapper or drum on which a plurality of cleats is usually mounted. The design of conventional compactor wheels varies widely, but in general a compactor wheel is designed to compress (i.e., compact) soils and waste by concentrating the weight of the compaction machine on the relatively small area of the cleats to break apart, size reduce, and compact waste or soils by imparting static breaking forces thereon.

It is recognized that, over time, the external surface of a compactor wheel wears down due to impact and sliding friction, with the compactor wheel cleats wearing down and becoming less efficient in compressing and breaking apart waste, and the surface of the outer wrapper wearing down such that a thickness thereof is reduced and the inner/outer edges of the wrapper become worn. In order to extend the longevity of a compactor wheel body, it is therefore necessary to periodically recondition the compactor wheel, replace compactor wheel cleats, and/or recondition the outer wrapper. With respect to reconditioning the outer wrapper, the outer wrapper is typically manufactured to have a thickness of 1" to 2" and, in reconditioning the outer wrapper, the standard in the industry for the allowable reusable thickness of an outer drum or wrapper is a minimum of ¾" or 75% of new—with such a thickness providing enough integrity of the outer wrapper to prevent the teeth from pushing through a wrapper that was worn to the point of failure and ensure the outer wrapper lasts the life of any new teeth installed, such that useful teeth are not thrown away on a failed wrapper. Described here below are various techniques currently employed in the industry for reconditioning a compactor wheel.

A first known technique for reconditioning a compactor wheel is generally referred to as "re-cleating" or as a "tooth tip swing exchange". In such a technique, the worn teeth, tips, or cleats are removed by a carbon arc process or plasma cutting process. New teeth are then applied and welded in the spacing between existing worn teeth. All or any other blemishes or defects on the wheel sets may also be repaired or replaced, such as worn inner and outer wrapper or drum edges being either cut off (if badly worn) or repaired, with it being recognized that the severity of the wear to the edges determines the type of repair to be performed and the total cost to repair. As one example, a hard-face ring or band that is typically 1" wide and ⅛" thick may be applied to the inner and outer edges of the compactor wheel, so as to protect the integrity or life span of the remaining wheel edges and allow them to wear at least as long as the life span of the new teeth—with FIG. 18 illustrating a known technique of welding a ring 2 to the wrapper 4 of the compactor wheel around the inner/outer edges thereof and FIG. 19 illustrating a known technique of welding bands 6 to the wrapper 4 along the inner/outer edges in areas between cleats 8. As another example, some instances would require cutting the first 4"-10" off the original inner and outer wheel edges, as illustrated in FIG. 20. This practice is almost as expensive as removing and replacing the outer drums completely, as it requires having to cut and re-weld the wheel on both the inner and outer sidewalls for either operation. As the wheel diameter may be as large as 38"-80" in some cases, labor costs can multiply quickly and are the same as a total outer wrapper replacement or complete rebuild.

For resurfacing and thickening the outer wrapper 4 to bring it back to a total thickness of ¾" or more as required, the first technique then rolls two sections of ¼"-⅜" thick×3" wide bar stock 9. These sections are clamped down and then welded solid all the way around the wheel outer diameter (O.D.) between each radial row of teeth 8, as shown in FIG. 21. Two passes around the O.D. of each row of teeth 8 must be welded solid. These wheels normally have four (4) to five (5) rows of open wheel face between the rows of teeth. That means to finish a wheel, it is necessary to go around it eight (8) to ten (10) times.

The welding of rings 2 and/or bar stock 9 to the outer wrapper 4 is recognized as being only a band-aid type temporary fix. Once the rings/rolled bar stock wears itself or between its welded inner and outer edge, it tears away from the wheel face, plus the thinly worn original wrapper or outer drum face 4 under the welded ring/bar stock 2, 9 is still in the same failed condition that it was originally in—such that its integrity is compromised and eventually fails. In instances of failure where the bands and/or bar stock welded to the edges and wrapper of the compactor wheel come loose and tear away from the wheel face, the bands and/or bar stock may cause damage to the compaction machine, such as by cutting hydraulic and brake lines and/or by causing damage to a machine side panel.

A second known technique for reconditioning a compactor wheel is by performing a total rebuild or replacement of the outer drum, as illustrated in FIG. 22—i.e., removing the worn wrapper 4 and scrapping it and subsequently welding on a new replacement wrapper 4. Such a technique is often employed if the wheel edges become so worn that they intrude into the welded sidewall area, such that the wheels or welds holding the wrapper 4 to the wheel body fails—which can be very costly due to collapse of the wheel under the weight of the compaction machine. A total rebuild where four (4) new 1"-2" thick outer drums are replaced, depending on unit type and size, will cost an additional $11,000-$22,000 to an already costly rebuild.

It would therefore be desirable to provide a method for reconditioning the outer wrapper of a compactor wheel, with such a method lowering the cost of such a reconditioning, providing an outer wrapper with a desirable finish that allows for the easy welding of new cleats/teeth thereto, and increasing the longevity of the rebuilt compactor wheel beyond what is achievable with existing rebuilding techniques.

BRIEF DESCRIPTION OF THE INVENTION

The invention is directed to a method for reconditioning a compactor wheel of a compaction machine.

In accordance with one aspect of the invention, a method for reconditioning a compactor wheel of a compaction machine is provided. The method includes mounting a compactor wheel on a positioning system configured to provide one or more of angular adjustment, vertical and horizontal translation, and rotation of the compactor wheel, so as to position the compactor wheel in a desired position. The method also includes providing a welding system configured to perform a submerged arc strip welding operation on the compactor wheel and performing the submerged arc strip welding operation on at least one surface or edge of the compactor wheel to add weldable material thereto, so as to recondition the at least one surface or edge of the compactor wheel.

In accordance with another aspect of the invention, a wheel of a compaction machine is reconditioned by a process that includes the steps of mounting a compactor wheel, providing a welding system configured to perform a weld cladding operation on the compactor wheel, and performing the weld cladding operation, via the welding system, on at least one surface or edge of the compactor wheel to one or more strips of weldable material thereto, so as to recondition the at least one surface or edge of the compactor wheel.

Various other features and advantages will be made apparent from the following detailed description and the drawings.

BRIEF DESCRIPTION OF THE DRAWINGS

The drawings illustrate embodiments presently contemplated for carrying out the invention.

In the drawings:

FIGS. 13A-13D show steps of performing a reconditioning process of an outer wrapper of a compactor wheel, according to an embodiment of the invention.

DETAILED DESCRIPTION

Embodiments of the invention provide a method for reconditioning a compactor wheel of a compaction machine. A submerged arc strip welding or weld cladding process is employed to recondition the wheel, with strips of weld wire being applied onto an outer wrapper and/or edges thereof of the compactor wheel. The finish that results from this method of welding is highly desirable, with very little or no grinding, sandblasting, or wheel prep being required for welding any tooth type to the new surface. The weld material or alloy steel blend used for the welding process is wear resistant so as to increase the longevity of the rebuilt compactor wheel, and may be applied onto the outer wrapper around an outer diameter thereof in a single, continuous pass, so as to reduce the cost of reconditioning the compactor wheel.

Figure 1:
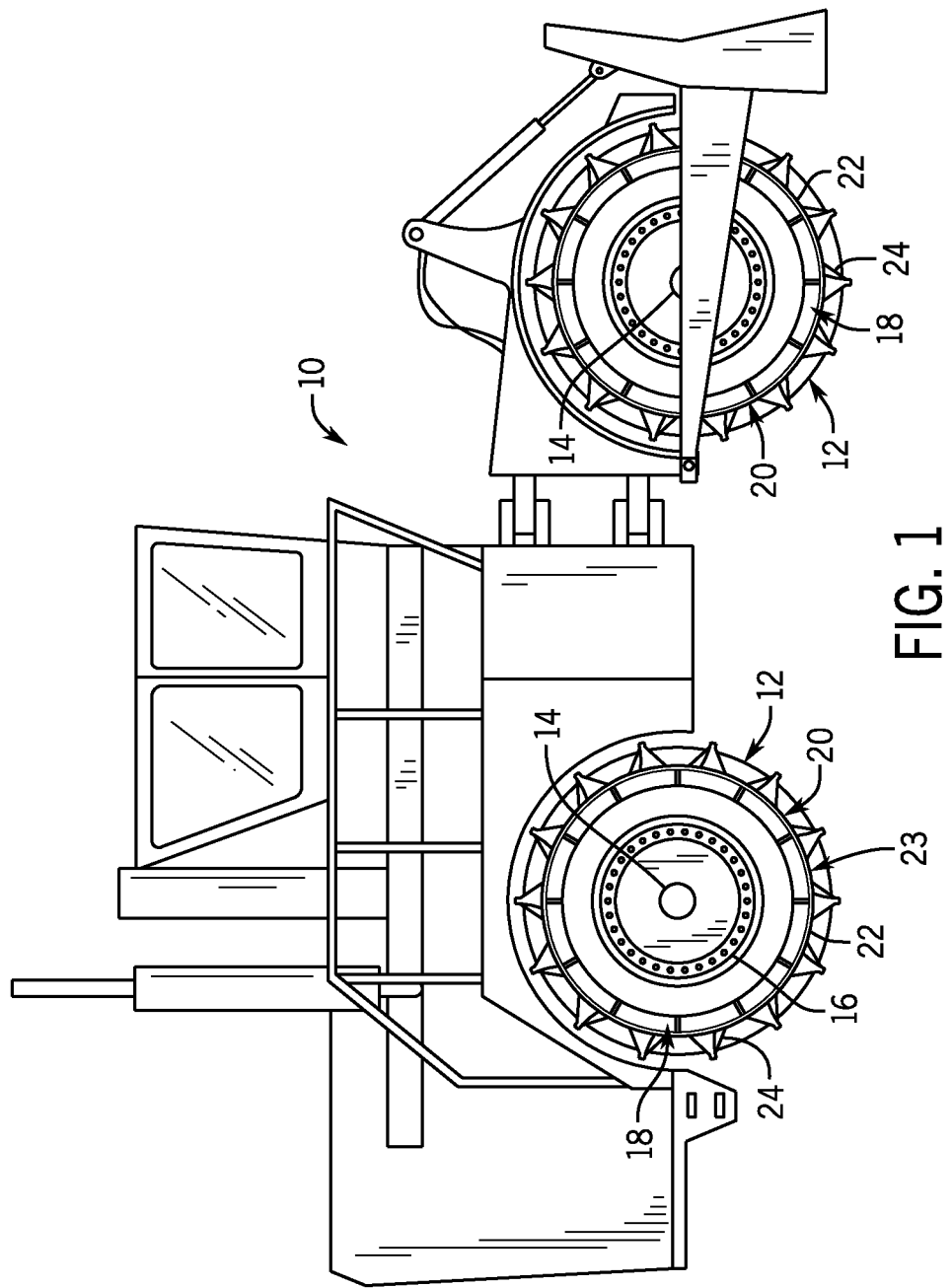
FIG. 1 is a side view of a compaction machine having compactor wheels mounted thereon for use with embodiments of the invention.

Referring to FIG. 1, a compaction machine 10 on which embodiments of the invention may be employed is shown. The present invention is not intended to be limited to any particular type of compaction machine 10 and may be used on any suitable compaction machine. In general, the compaction machine 10 includes compactor wheels 12 mounted on axles 14 of the compaction machine, with the wheels 12 including a hub 16 adapted, for example, with a plurality of bolt holes for being bolted or otherwise mounted to the axle 14. A rim 18 is mounted around the hub 16, with the rim 18 including a wrapper or drum 20 having an inner circumferential edge 21 and an outer circumferential edge 23 (better shown in FIG. 5, for example) that generally define the inner and outer ends of the compactor wheel 12, as well as an outer face or surface 22 that faces and makes contact with a surface that is traversed by the compaction machine. A plurality of cleats 24 (i.e., teeth) are mounted on the compactor wheels, such as by welding to the outer wrapper 20, with the cleats 24 being mounted in any of a variety of patterns, as desired, such as being aligned in a plurality of rows, for example.

According to embodiments of the invention, a submerged arc strip welding or weld cladding process is employed for reconditioning the outer wrapper 20 of a compactor wheel 12. The process welds on or applies a weld material that replaces or increases the original outer drum edge thickness lost to friction wear. The weld material may be in the form of a strip weld wire coil or alloy steel blend that provides strength and longevity to the reconditioned outer wrapper 20, and may thus be in the form of a steel matrix deposit that is stronger and will last up to four times longer than any low carbon steel plate or A-36 mild carbon steel, which is the standard material type used in the landfill and soil wheel compactor industry. The submerged arc strip welding or weld cladding process can be used on old worn wheel edges 21, 23, with this reconditioning procedure being used to add limitless passes of material to build up the worn wrapper thickness back to like new specifications (i.e., thickness). In addition, should a customer choose to desire wheel edges 21, 23 that are thicker than new, the submerged arc strip welding or weld cladding process can be used to apply still additional material to further thicken the wheel edges. Still further, it is recognized that, upon the resurfacing of the compactor wheel 12 (via application of material using the submerged arc strip welding or weld cladding process) to build up the worn wrapper thickness, it may be desirable to have the outer diameters machined back down to exact original OEM specifications, with such machining being possible via implementation of the present reconditioning technique.

According to embodiments of the invention, an abrasion resistant weld material can also be applied onto the outer wrapper 20 for hard-surfacing 1" to 3" wide and ¼" to ½" thick strips along the top of each wheel inner and outer edge 21, 23. The weld material applied to the edges 21, 23 of the compactor wheel 12 may be any of a variety of materials, including but not limited to stainless, chrome nickel molybdenum, or tungsten carbide impregnated strip weld material. All of these, including standard weld strip or wire material, are harder and more wear resistant than A-36 (mild carbon steel) or any abrasion resistant (A.R.) steel (e.g., A.R. 400, a type of wear resistant bar stock) and will last up to 10 times longer than some of these materials. In addition to the hardness and wear resistance of the strip welded material applied onto the edges 21, 23, it is recognized that the strip welded material melts into the base material of the outer wrapper 20 and thus will not break away therefrom and cause any damage. This is in comparison to prior art reconditioning techniques where bar stock is put in between teeth 24 on the inner/outer edges 21, 23 of a compactor wheel 12 or where rolled bar-stock, rolled rings, or liners are put in between the rows of teeth 24 on a compactor wheel 12, with it being recognized that such bar stock, rolled rings, or liners are only as strong or last as long as the small welds holding the material down to the wheel body and that, once these welds wear down to where they can't hold the bar or rings down, they fail.

The abrasion resistant weld material can be applied to the horizontal edges 21, 23 of the compactor wheel 12 in one radial pass and one wheel rotation with a two-head submerged arc welder, with the material being applied in 1"-3" wide strips that are ⅛"-½" thick. The abrasion resistant weld material can thus be applied at a cost of $200 for one rotation. The current industry standard for the application of wheel edge hard-face is a 1" wide and ⅛" thick application of material circumferentially around the outer diameter of each horizontal edge—with such passes providing only a 1" wide by ⅛" thick protective weld. The current prior art technique would need to weld 12 passes around each wheel edge 21, 23, or twenty four (24) times per wheel to get a ½" thick by 3" wide hardface bead around each wheel edge. At a very conservative average industry standard cost of $150 per pass, the prior art technique would thus be performed at a cost of $3,600 per wheel compared to a $300 cladding cost per wheel achievable with embodiments of the present invention.

Figure 2:
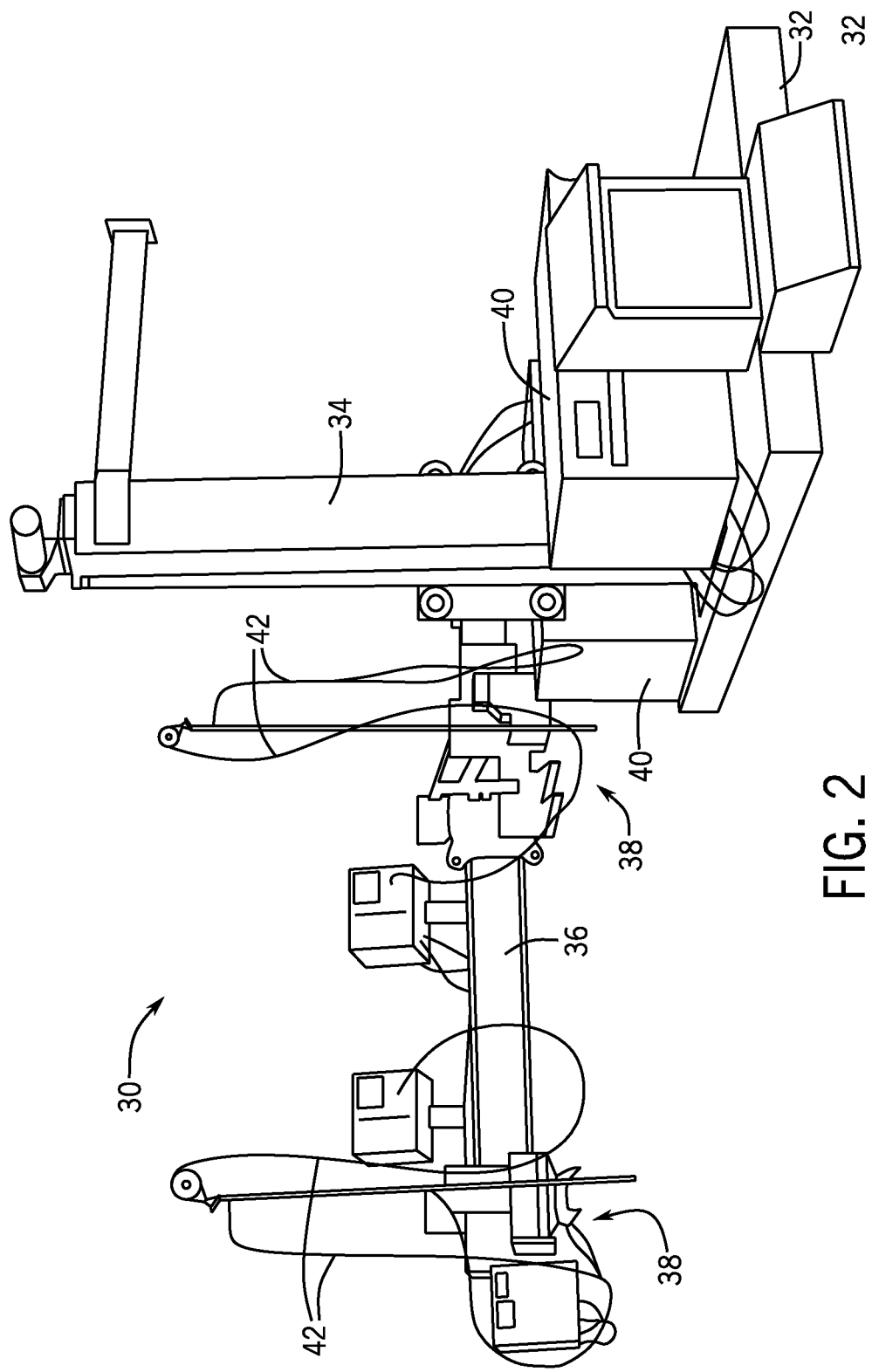
FIG. 2 shows perspective views of exemplary dual feed submerged arc welding apparatuses, for use with embodiments of the invention.

Referring now to FIGS. 2-5, various views of welding manipulators, turn tables, positioners, and dual feed submerged arc welding apparatuses that can be used to fully automate the welding process are shown, according to an embodiment of the invention, with such systems/apparatuses reducing normal labor costs involved in current compactor wheel rebuild methods. Referring first to FIG. 2, an exemplary dual feed submerged arc welding system 30 useable with embodiments of the invention is shown. The submerged arc welding system 30 is useable with a robot positioner having a base 32, a first arm 34, and a second arm 36 that collectively provide for three-axis movement of one or more flat strip sub-arc weld heads 38 of the welding system 30 relative to a compactor wheel 12. The flat strip sub-arc weld heads 38 may be mounted to second arm 36 via suitable attachment brackets (not shown). In the illustrated embodiment, the submerged arc welding system 30 also includes power sources 40 and weld head cables 42. The power sources 40 provide electric power to the weld heads 38 via the weld head cables 42 and, in one embodiment, may also direct the feeding of gas to the weld heads 38.

One or more flat strip weld wire supplies (not shown) are also included in the submerged arc welding system 30 to provide flat strip weld wire (i.e., electroslag weld strip) to the weld heads 38. Each wire supply supplies welding wire to a wire motor (not shown), which feeds the welding wire to a respective weld head 38. In other words, the wire motor moves the welding wire from the wire supply along a wire path to the weld head 38. Additionally, the submerged arc welding system 30 includes a flux supply or hopper 41 that supplies flux 43 (FIG. 4) through to the weld heads 38. The flux 43 includes granular fusible flux particles. The flux particles may include lime, silica, manganese oxide, calcium fluoride, or a combination thereof. The flux 43 may also include flux fines (i.e., small particles) and dust of the same or similar composition as the flux particles. In one embodiment, the flux supply 41 includes a pressurized flux delivery system that employs pressurized air to push or otherwise move flux through the flux lines, wherein the flux lines is directly connected to the weld heads 38.

Figure 3:
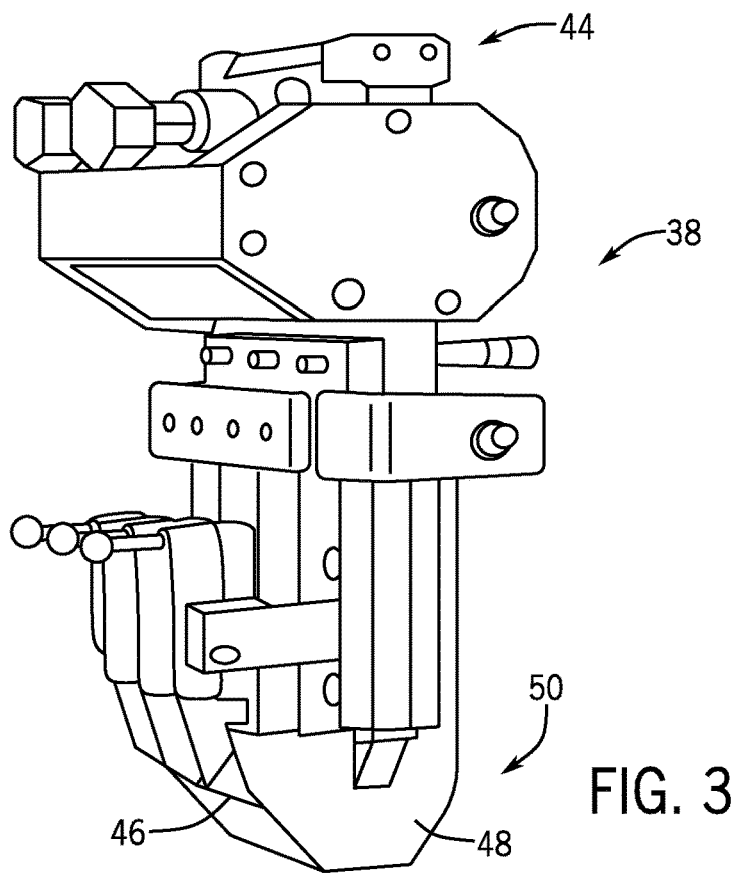
FIGS. 3 and 4 are perspective views of a flat strip sub-arc weld head for use in the systems of FIG. 2, for use with embodiments of the invention.
Figure 4:
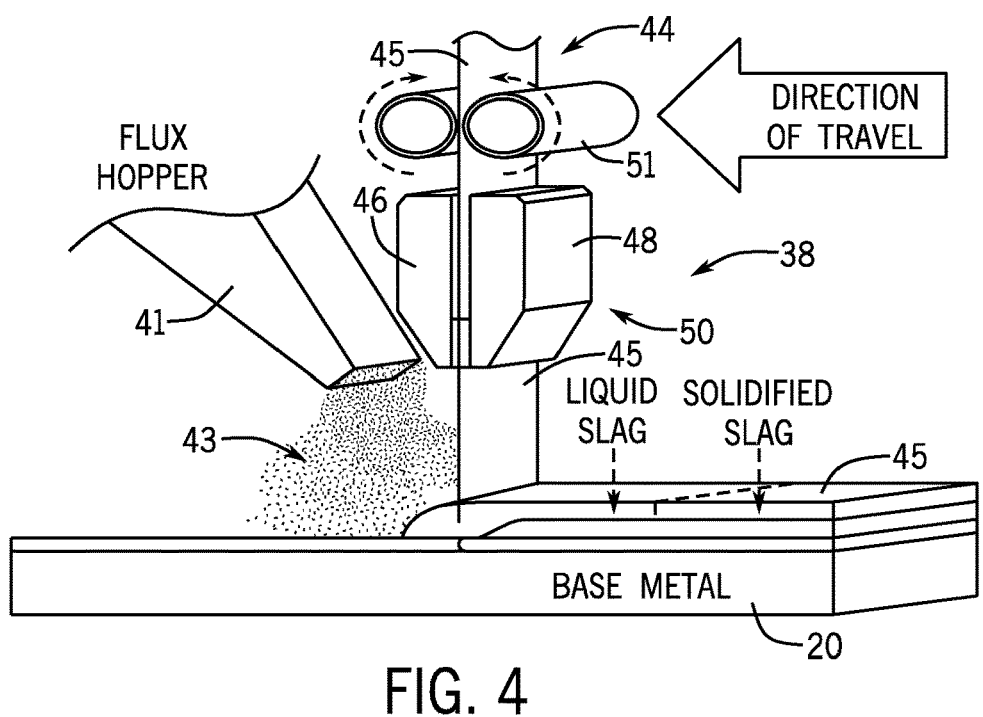

Referring now to FIGS. 3 and 4, a more detailed view of the flat strip sub-arc weld head 38 is provided, according to one embodiment. The weld head 38 is configured to provide a continuous feed of flat strip weld wire 45 to a compactor wheel 12 to provide for reconditioning thereof, according to an embodiment of the invention. The weld wire 45 is unwound regularly from a weld wire supply and is fed to weld head 38, where the weld wire 45 is then pushed forward along a guide groove 44 up to vises 46, 48 of a pliers electrode 50. Feeding of the weld wire strip 45 through the jaws 46, 48 of pliers electrode 50 may be carried out by means of a pulling unit through with the strip is passed, with the pulling unit including, for example, a pair of rolls 51 rotating in opposite directions, which unwind the strip by frictional force and force the same to pass between the jaws of the pliers.

Figure 5:
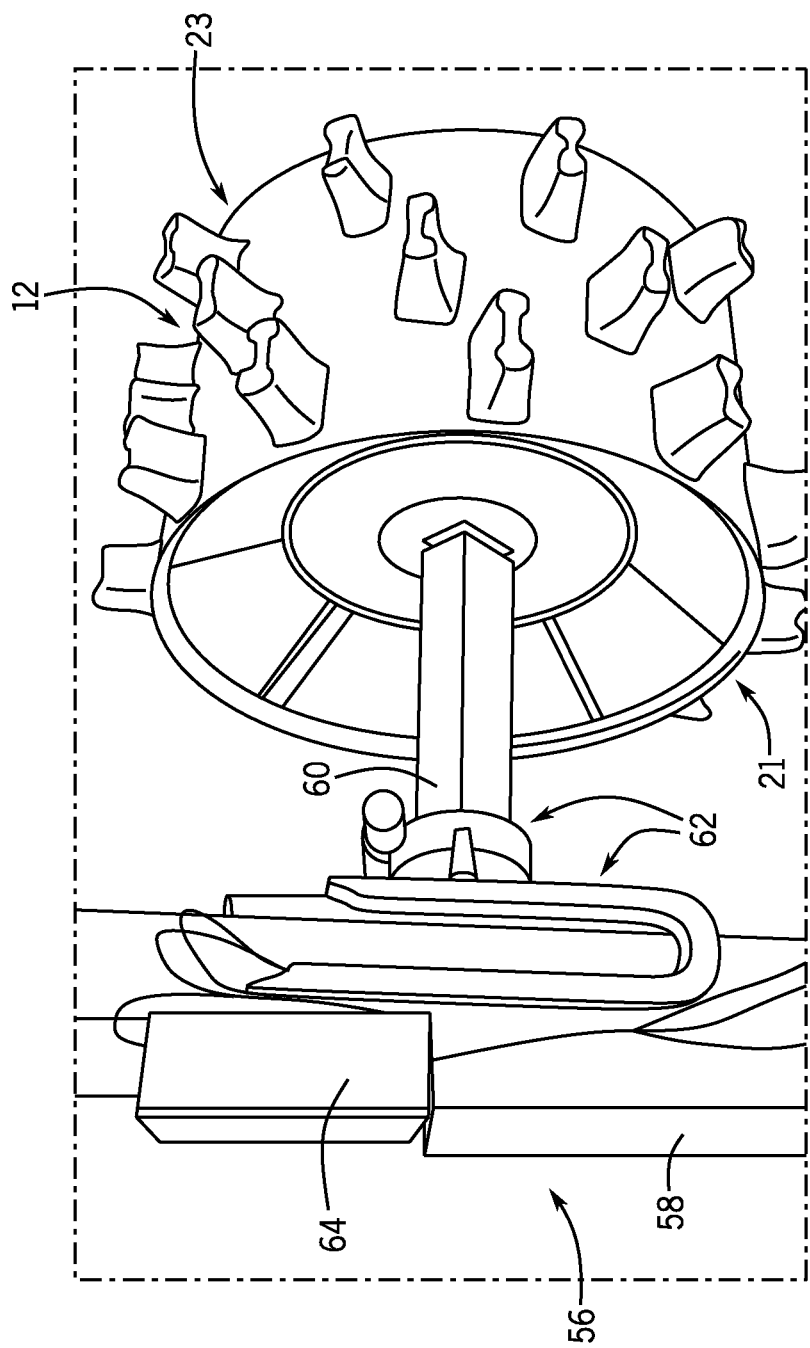
FIG. 5 illustrates a positioning system used to mount and rotate a compactor wheel for reconditioning, for use with embodiments of the invention.

Referring now to FIG. 5, a positioning system 56 is illustrated that is used to mount and rotate the compactor wheel 12 relative to the submerged arc welding system 30 for purposes of performing a reconditioning/resurfacing. According to an exemplary embodiment, the positioning system comprises translational and rotational positioners that provide for six degrees of freedom in orienting/positioning the wheel as required to perform the welding operation. That is, positioning system 56 is configured to allow compactor wheel 12 to be moved in a horizontal plane defined by the x axis and y axis, to be moved vertically out of this plane along the z axis, and to be tilted and rotated about one or more axes. As shown in FIGS. 4 and 5, positioning system 56 includes a drive apparatus 58 that provides for translation and rotation of a mounting arm 60 on which the compactor wheel 12 is mounted. The drive apparatus 58 is comprised of a plurality of servomotors 62 that are selectively activated to cause movement of the mounting arm 60 in a desired manner, so as to enable positioning of the compactor wheel 12 to various desired locations in three dimensional space, as well as rotation of the compactor wheel 12. The drive apparatus 58 also includes a control system 64 to send command and control signals to the servomotors 62 to control operation thereof.

In performing the submerged arc strip welding or weld cladding process operation for reconditioning the compactor wheel 12, the positioning system 56 first positions the compactor wheel 12 in a desired location, with the dual feed submerged arc welding system 30 then being positioned to perform the reconditioning of the outer wrapper 20. In performing the welding operation, the flat strip sub-arc weld head 38 is moved into position—with electrode 50 of the weld head 38 and the electroslag weld strip 45 striking an arc with the outer wrapper 20 and depositing material onto the outer wrapper 20. According to one embodiment, the electroslag weld strip 45 comprises a strip that is up to 3" wide and ⅛" thick, although it is recognized that an electroslag weld strip 45 having other widths and thicknesses may be used. In applying the electroslag weld strip 45 onto the outer wrapper 20, the granular fusible flux 43 is deposited onto the outer wrapper 20 to protect the molten weld and arc zone of the welding process, with the granular fusible flux 43 consisting of lime, silica, manganese oxide, calcium fluoride, and/or other compounds, for example. The flux 43 starts depositing on the joint to be welded and, since the flux 43 when cold is a non-conductor of electricity, the arc may be struck either by touching the flat strip 45 and electrode 50 with the work piece or by placing steel wool between electrode 50 and work piece before switching on the welding current or by using a high frequency unit. When molten, the flux 43 becomes conductive, and provides/maintains a current path between the flat strip 45/electrode 50 and the work piece (i.e., the outer wrapper 20). This thick layer of flux 43 completely covers the molten metal thus preventing spatter and sparks.

The submerged arc strip welding or weld cladding process is normally performed in an automatic or mechanized mode and the flat-strip electrode is continuously fed to the outer wrapper 20 at a predetermined speed. A separate drive moves either the welding head 38 over the stationary work piece or the work piece moves/rotates under the stationary welding head 38. In advancing the weld head 38 along the outer wrapper 20, an arc length is kept constant by using the principle of a self-adjusting arc. If the arc length decreases, arc voltage will increase, arc current and therefore burn-off rate will increase thereby causing the arc to lengthen. The reverse occurs if the arc length increases more than the normal. As the weld head 38/electrode 50 progresses, an electroslag weld strip 45 is deposited on the outer wrapper 20 as liquid slag and then solidifies as it cools to resurface the outer wrapper 20.

In performing the reconditioning of the outer wrapper 20, the weld head 38 and/or compactor wheel 12 can be moved in a desired manner to resurface the outer wrapper 20 and rebuild outer/inner edges 21, 23 thereof. In one step/process of the reconditioning, the electroslag strip cladding is used to rebuild worn edges 21, 23 on the outer drum 20 and recondition (i.e., thicken) the outer wrapper 20, in order to put the outer drum 20 material thickness back to or thicker than OEM specifications. According to one embodiment, a specific abrasion resistant weld material can also be applied onto the outer wrapper edges 23 for hard-surfacing, with the application of the abrasion resistant weld material being done in one radial pass and one wheel rotation via the two-head submerged arc welder 30. In another embodiment, the electroslag strip cladding is used to recondition the outer drum 20 at locations between the radial rows of teeth 24 where wheel drum material has been lost due to wear/friction, such as on a dirt compactor wheel 12. Using the submerged arc welding system 30, these inner rows can be re-surfaced in one pass all the way around the wheel outer diameter between each row, in order to put the outer drum material thickness back to or thicker than OEM specifications. This is as opposed to the prior art of adding replacement rings between rows of teeth 24, which need to be rolled and welded on each side between the rows of teeth, such that there is a large labor cost associated with reconditioning a wheel needing 4-6 rings and two welds for each ring all the way around the wheel O.D.

Figure 6:
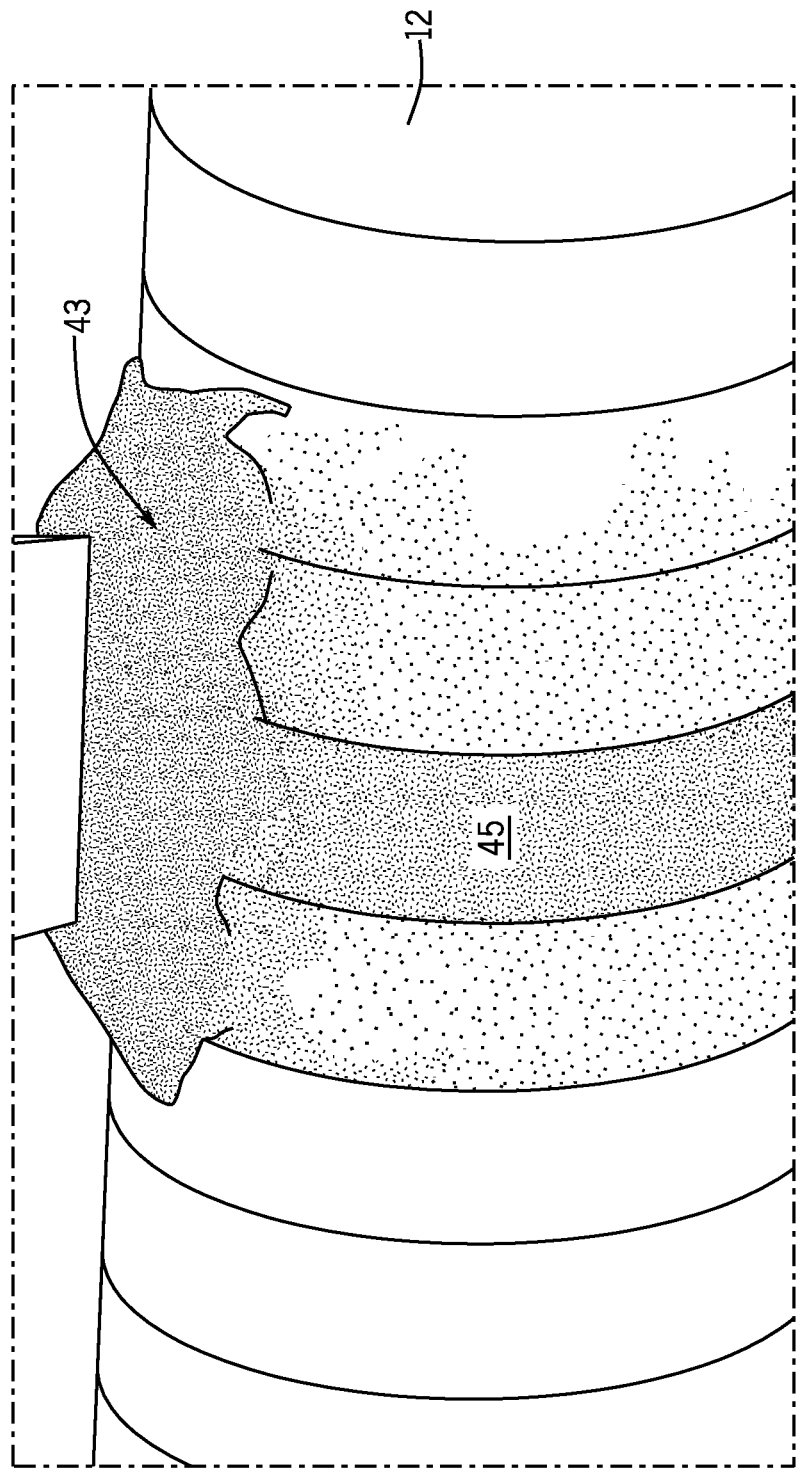
FIGS. 6 and 7 show an application of an electroslag weld strip onto the outer wrapper of the compactor wheel, according to embodiments of the invention.
Figure 7:
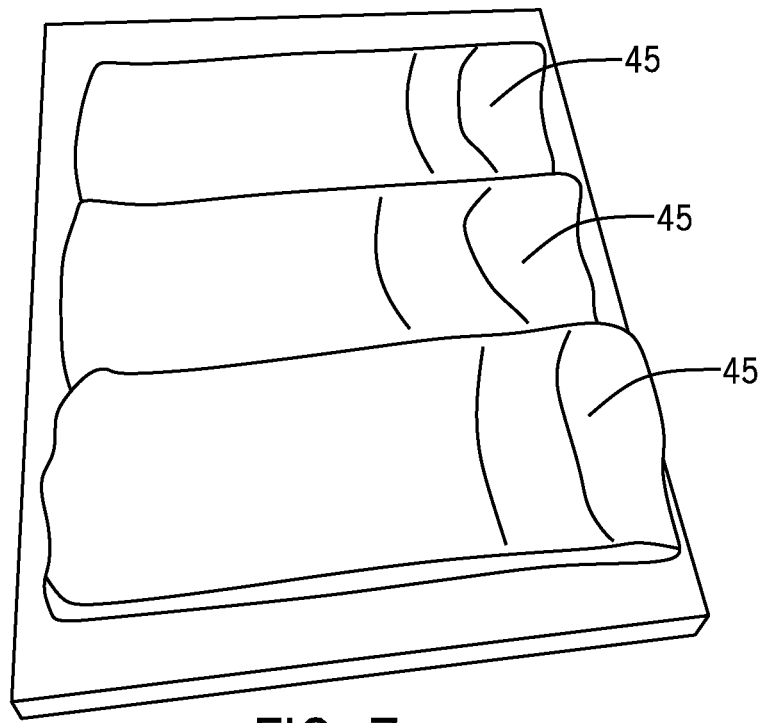
Figure 8:
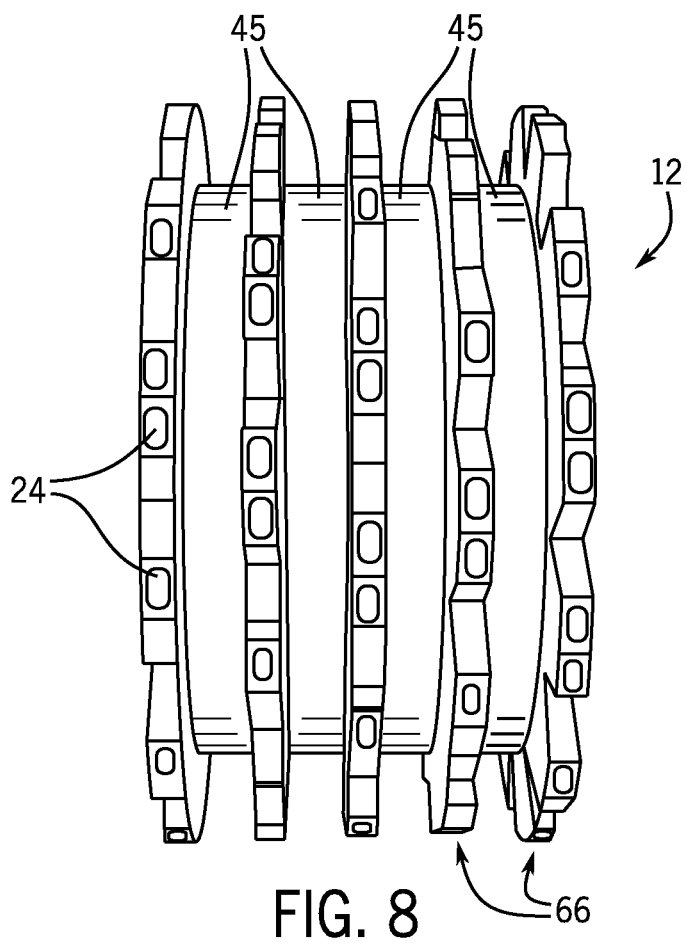
FIGS. 8-10 show locations on the compactor wheel where electroslag weld strips may be applied, according to embodiments of the invention.
Figure 9:
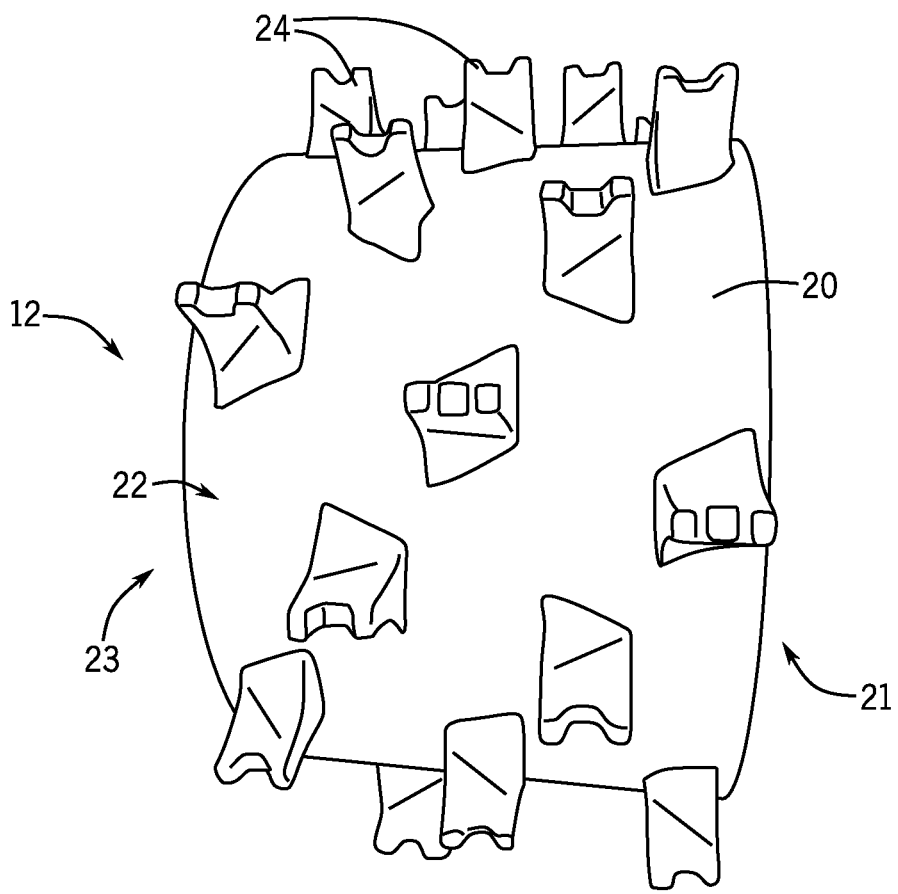
Figure 10:
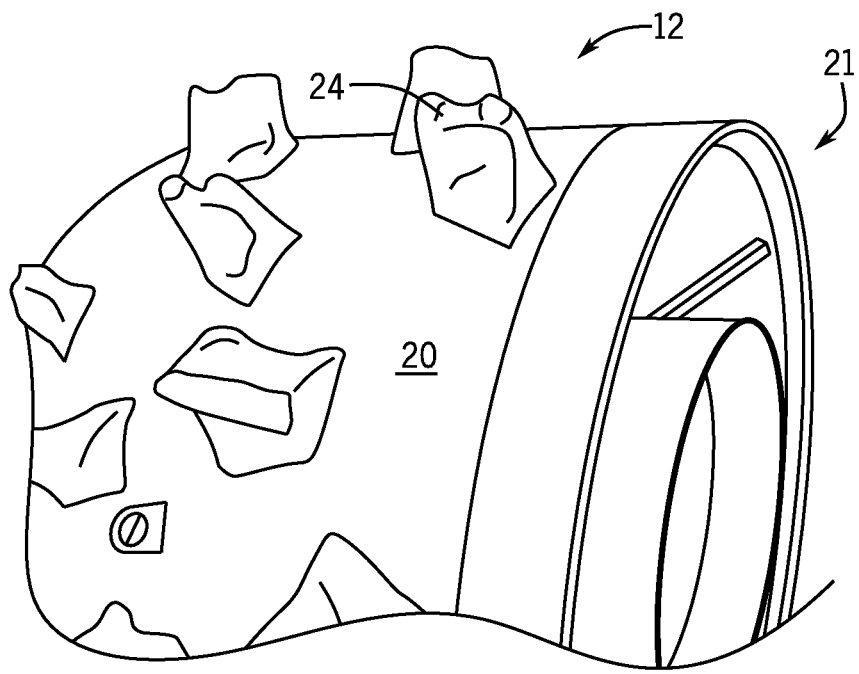

FIGS. 6 and 7 illustrate exemplary applications of an electroslag weld strip 45 and flux 43 onto the outer wrapper 20 of the compactor wheel 12 and the resulting weld strips that are formed, while FIGS. 8-10 illustrate locations on the compactor wheel 12 where the strips 45 are applied—i.e., between radial rows 66 of teeth 24 of the compactor wheel 12 (FIG. 8), on one or more edges 21, 23 of the compactor wheel 12 (FIGS. 9 and 10), and/or on an entire outer wrapper 20 of the compactor wheel 12. As can be seen, the finish that results from the electroslag strip cladding is highly desirable, with there being very little or no grinding, sandblasting or wheel prep required for welding any tooth type to the new surface, and with paint adhering easily thereto.

Figure 12:
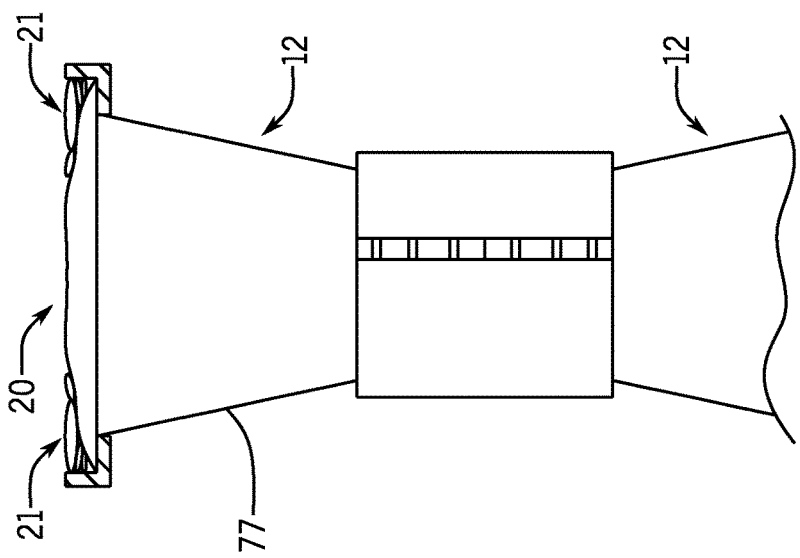
FIG. 12 shows attachment of an angle iron to a compactor wheel edge for rebuilding an edge thereof, according to an embodiment of the invention.
Figure 11:
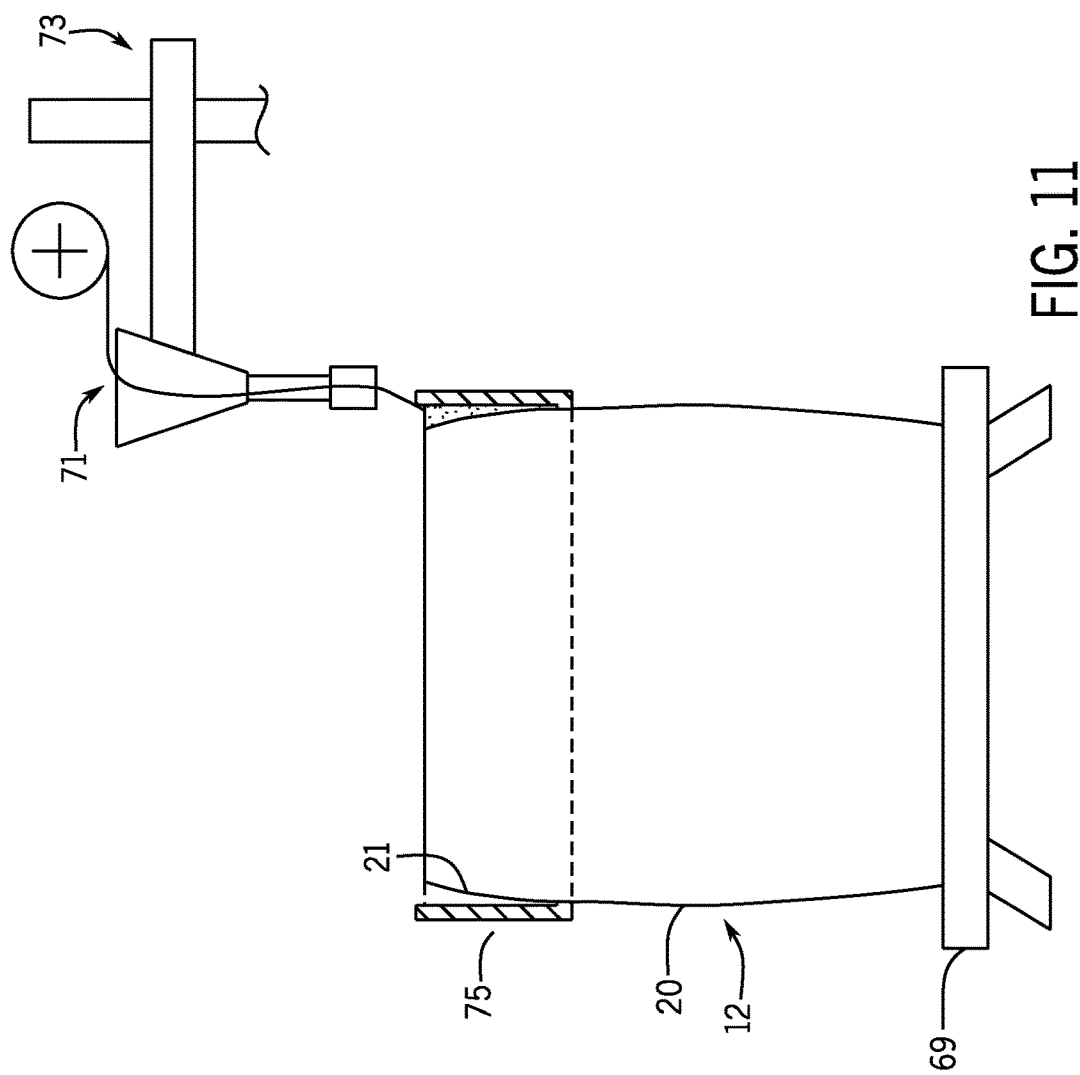
FIG. 11 shows a rotating table and electro-slag welding unit for performing a submerged arc welding (SAW) operation on a compactor wheel to rebuild an edge thereof, according to an embodiment of the invention.

Referring now to FIGS. 11 and 12, additional welding systems and methods are illustrated by which the surface 22 and inner/outer edges 21, 23 of an outer wrapper 20 of a compactor wheel 12 may be reconditioned, according to additional embodiments of the invention. Referring first to FIG. 11, reconditioning of the outer wrapper 20 is performed via use of a rotating table 69 and an electro-slag welding unit 71 movable via a manipulator 73, with an electro-slag sub-arc welding (SAW) method being employed for performing the resurfacing/reconditioning. In performing the reconditioning of the outer wrapper 20 (i.e., of the inner/outer edges 21, 23 thereof), a fixture 75 is first attached/mounted onto the compactor wheel adjacent the edge 21, 23 of the compactor wheel to be repaired (i.e., 21 in FIG. 12)—such that a small gap is provided between the fixture 75 and the wheel edge 21, 23. The compactor wheel 12 is then turned by the rotating table 69 and the electro-slag welding unit 71 is moved to a desired position via manipulator 73, with the electro-slag welding unit 71 then operating to deposit an electro-slag material (e.g., welding wire/material, such as steel of a desired composition) into the gap between the fixture 75 and the worn wheel edge 21, 23. As the compactor wheel 12 rotates on table 69, electro-slag material is continuously deposited to fill the gap—with electro-slag material thus deposited around an entire circumference of the compactor wheel 12 such that the worn edge 21, 23 of the outer wrapper 20 is resurfaced/rebuilt.

Referring now to FIG. 12, another method of rebuilding wheel edges 21, 23 of the outer wrapper 20 is illustrated, in which a circular angle iron 77 is added adjacent the edge of the outer wrapper 20. The angle iron 77 is first attached (e.g., welded) onto the compactor wheel 12 adjacent the worn edge 21, 23 (i.e., 21 in FIG. 12) of the compactor wheel to be repaired—such that a small gap is provided between the angle iron 77 and the wheel edge 21, 23. Upon attachment of the angle iron 77, the gap is then filled with new weld cladding to rebuild the worn area of the edge 21, 23. In one embodiment, it may be desirable to leave the angle iron 77 attached to the compactor wheel 12 after weld cladding of the edge 21, 23, thus the angle iron 77 may be formed of a suitably hard material (e.g., steel of a desired composition) such that it may be left in place. In another embodiment, it may be desirable to remove the angle iron 77 from the compactor wheel 12 after weld cladding of the edge 21, 23, thus the angle iron 77 may be formed of a non-ferrous material (e.g., copper) that may be removed after the weld cladding has cooled—so as to leave a better or "true" wheel edge made of weld material.

Figure 13B:
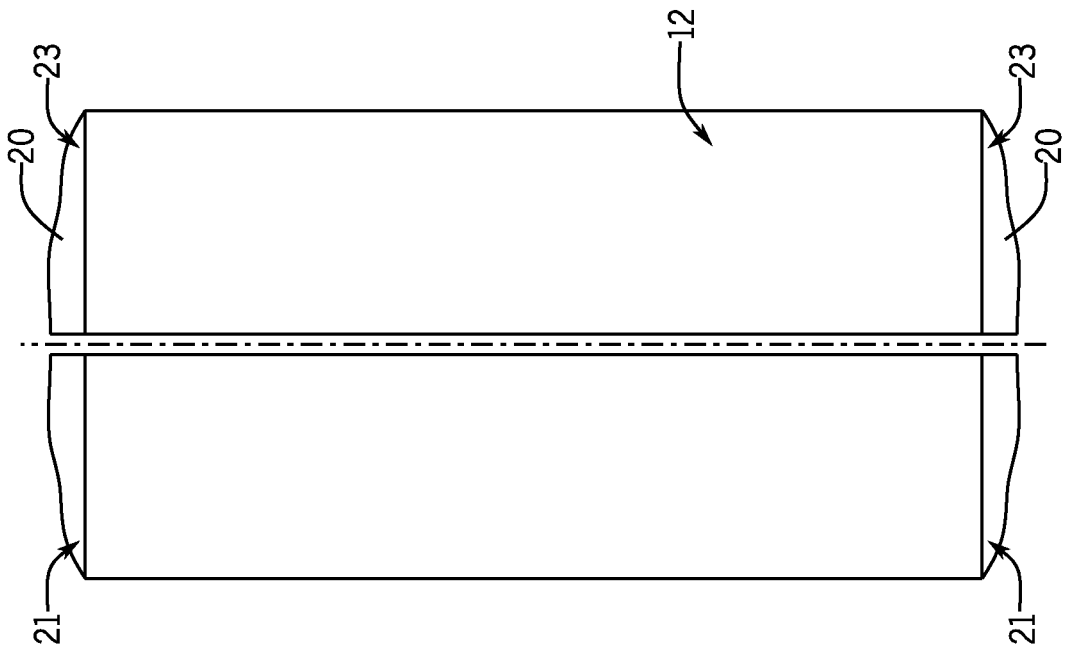
Figure 13A:
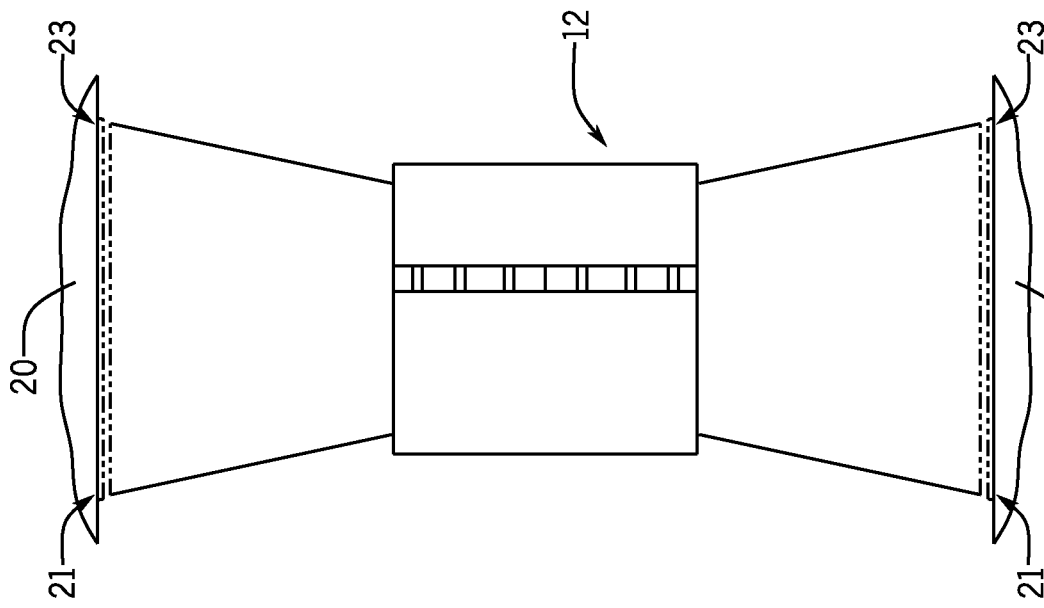

Still another embodiment of reconditioning the surface 22 and inner/outer edges 21, 23 of the outer wrapper 20 of compactor wheel 12 is illustrated in FIGS. 13A-13D. In the illustrated technique, an outer wrapper 20 with worn edges 21, 23 but still 75% of original thickness at its center, is removed from compactor wheel 12 by cutting sidewalls of the wheel so that the wrapper 20 comes off the wheel body, as illustrated in FIG. 13A. The worn outer wrapper 20 is then cut radially (FIG. 13B) and a sleeve or collar 79 is put around the inside diameter of the wrapper 20, with the two cut halves of the wrapper then being welded back together on the sleeve/collar 79 (FIG. 13C). As can be seen in FIG. 13C, in welding the cut halves of the wrapper 20 to the sleeve/collar 79, the orientation of the halves is flipped such that the worn edges 21, 23 of the wrapper 20 are positioned adjacent one another in a central region of the sleeve/collar 79. As shown in FIG. 13D, the wrapper 20 (and sleeve/collar 79 included therein) is then remounted to the wheel body by welding the wrapper 20 to the sidewalls, with the compactor wheel 12 then being resurfaced with weld cladding layers via a process/processes previously described in detail, so as to bring the worn outer wrapper 20 of the compactor wheel 12 back to its original outer diameter.

Figure 14:
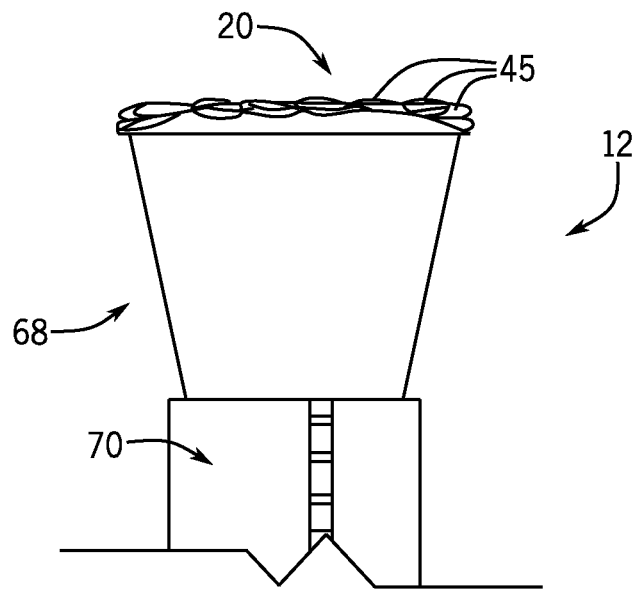
FIGS. 14 and 15 show inner sidewalls and bolt cylinder extensions of a compactor wheel that may be reconditioned, according to embodiments of the invention.
Figure 15:
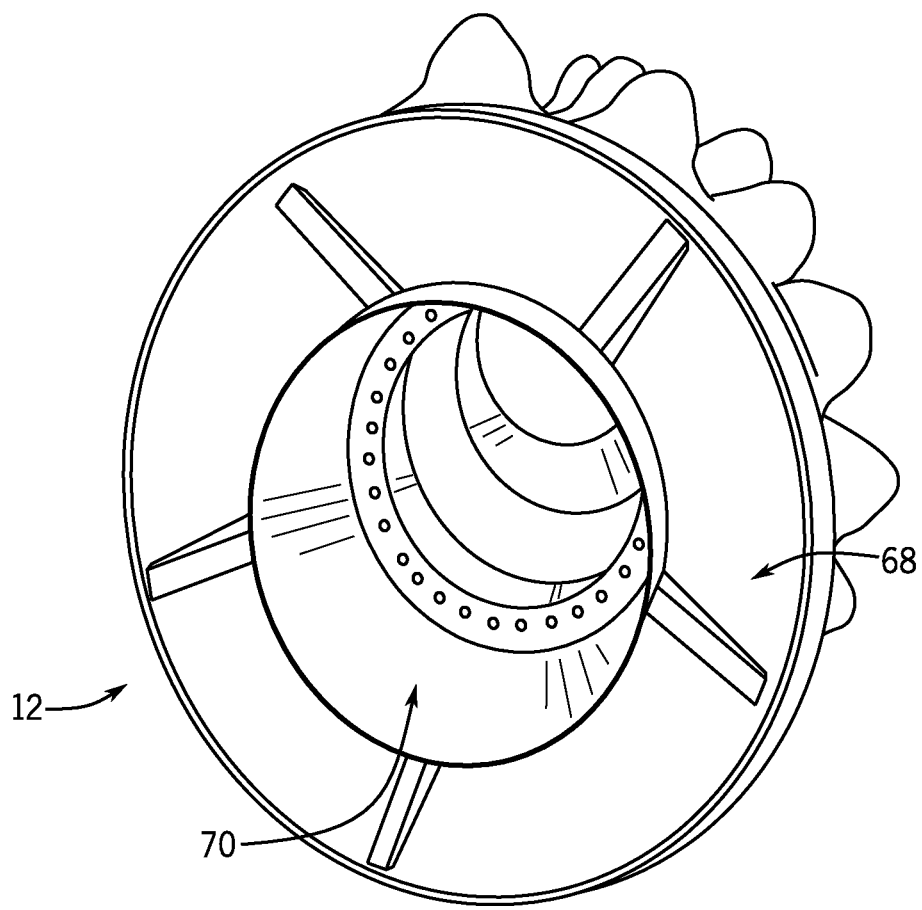

While embodiments of the invention have been discussed with respect to reconditioning the surface 22 and inner/outer edges 21, 23 of an outer wrapper 20 of a compactor wheel 12, it is recognized that the system and techniques of the present invention are also applicable to other features/components of the compactor wheel 12. Another high wear area of landfill compactor wheels 12 is the inner sidewalls 68 and bolt cylinder extensions 70, views of which are provided in FIGS. 14 and 15. Wire and other landfill debris tends to wrap itself around the axle 14 (FIG. 1) closest to the sidewalls 68, which can eventually wear down the sidewall thickness along with the edges of bolt cylinder 70 to a point of failure. These items are normally always replaced or re-lined on wheel sets sent in for re-cleat or rebuild exchange, and it is recognized that the technique of the present invention could be utilized to recondition such components 68, 70 whenever a compactor wheel 12 is brought in for recleating and/or resurfacing of the outer wrapper 20.

Figure 16:
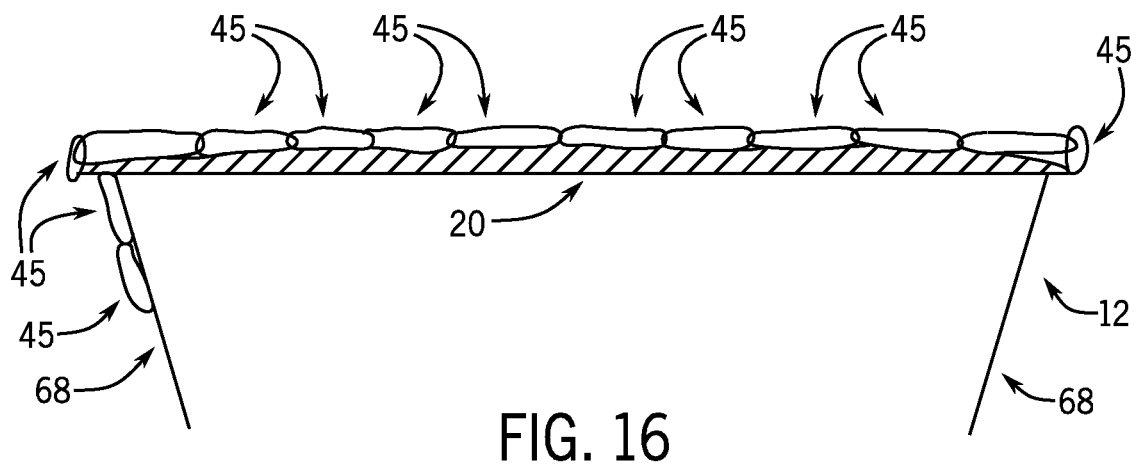
FIG. 16 shows resurfacing of the outer wrapper via multiple passes of strip weld material, along with resurfacing of welds between the outer rapper and an inner sidewall, according to an embodiment of the invention.

FIG. 16 illustrates a resurfacing on an outer wrapper 20 of the compactor via multiple passes of strip weld material 45 thereto, along with the resurfacing of welds between the outer wrapper 20 and a sidewall 68 of the compactor wheel 12 that is also performed via a strip weld application. This eliminates the need for re-lining the sidewalls 68 and welding them in place, or completely removing them by cutting them out and replacing them with new re-welded coned sidewalls 68 and bolt cylinders 70. As sidewalls 68 cost on average $1,800 installed, times four (4) wheels, reconditioning the sidewalls 68 via the submerged arc strip welding/weld cladding process of the present invention may provide a total savings over a machine life up to $21,600 for an end user, with the end user having a better product that will last longer than original OEM sidewall material specification.

Figure 17:
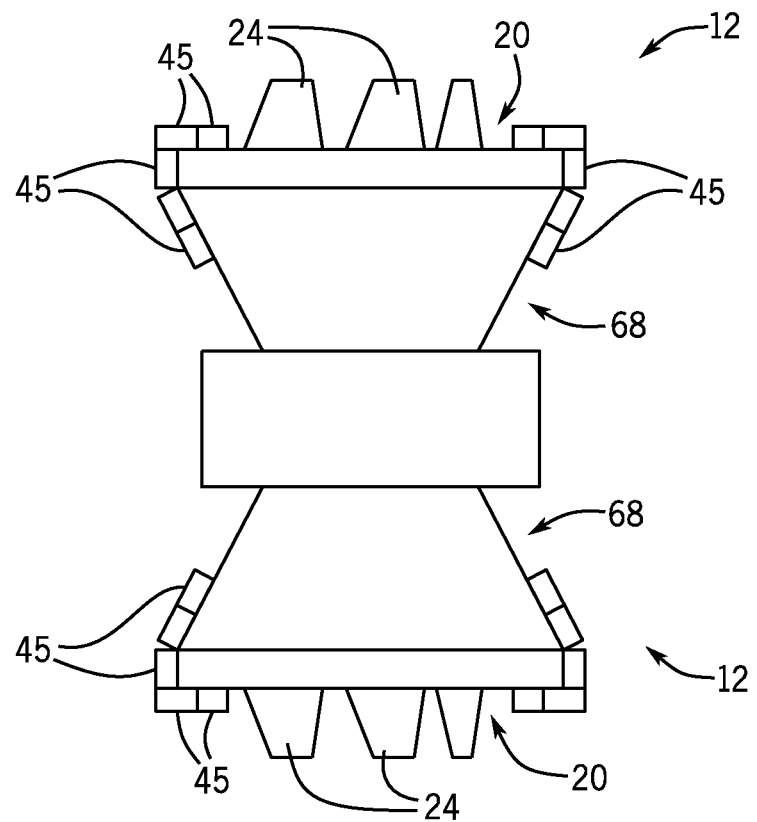
FIG. 17 shows cladding of the outer wrapper and sidewalls via multiple passes of strip weld material, so as to provide an edgeless compactor wheel structure, according to an embodiment of the invention.
Figure 18:
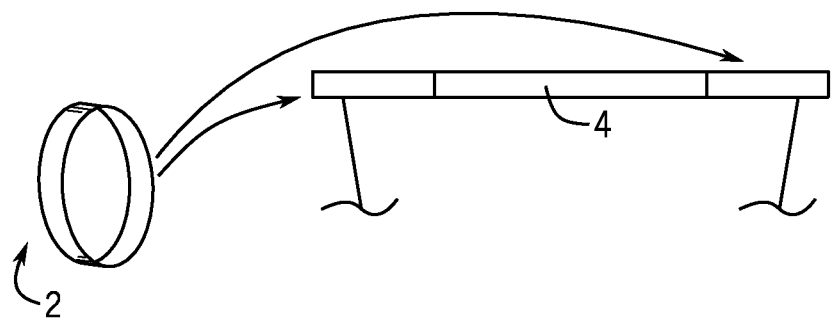
FIGS. 18-22 show known techniques for reconditioning an outer wrapper on the compactor wheel, and inner and outer edges of the compactor wheel.
Figure 19:
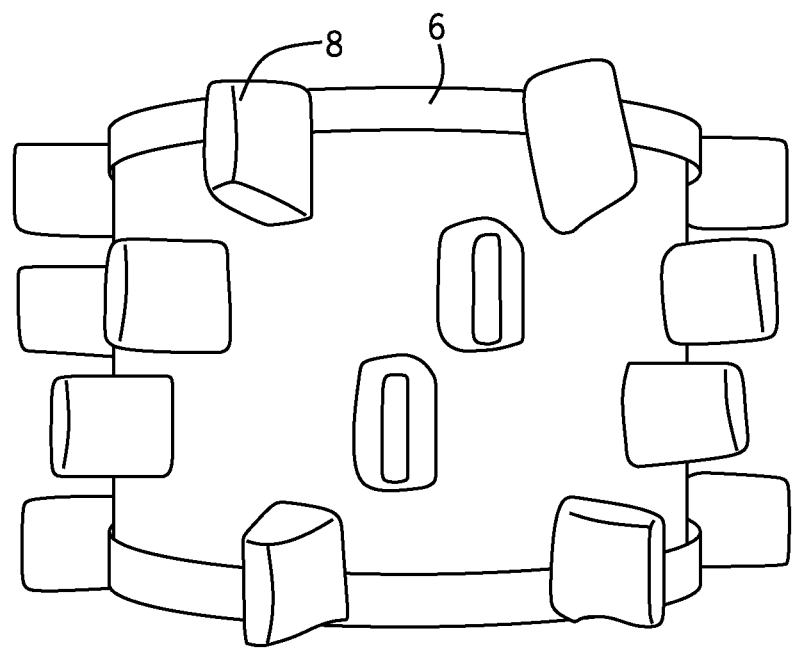
Figure 20:
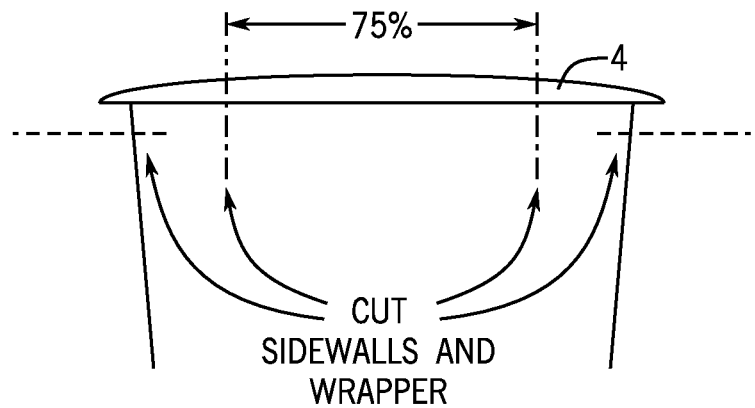
Figure 21:
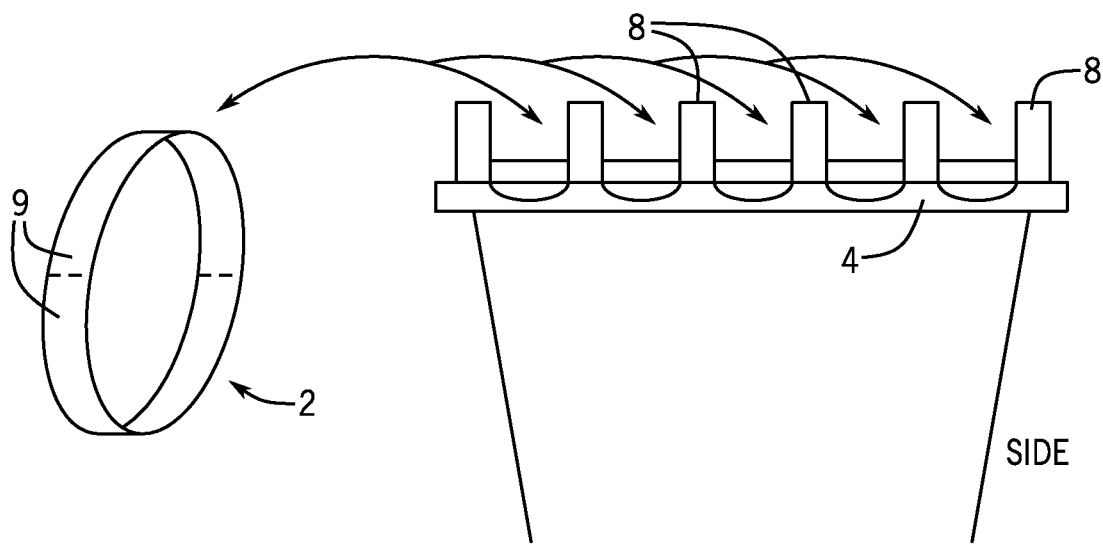
Figure 22:
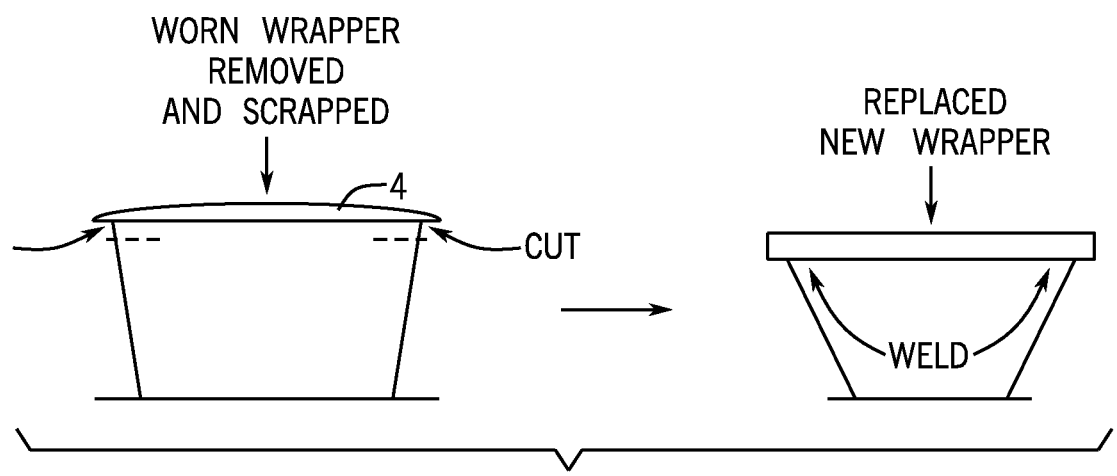

In another embodiment, and similar to that shown in FIG. 16, a resurfacing of the outer wrapper 20 and sidewall 68 of the compactor wheel 12 may be performed in a manner that results in an "edgeless" compactor wheel configuration/construction, as shown in FIG. 17. That is, current compactor wheel edges have a 1" to 2" edge that cuts into the compacting surface, pulling material up instead of keeping it down for each pass. According to an embodiment of the invention, the exemplary cladding process can apply three (3) to six (6) passes per wheel edge with a highly abrasion resistant matrix that would leave the inner and outer wheel edges 21, 23 smooth. That way as the weight of the compactor machine 10 weight pushes the wheel 12 down into the working compacted surface, it would not pull any material back up and the wheel would exit smoothly as the machine rolls back and forth.

Beneficially, embodiments of the invention thus provide a method for reconditioning a compactor wheel in which a submerged arc strip welding/weld cladding process is employed to recondition the wheel. The finish that results from this method of welding is highly desirable, with very little or no grinding, sandblasting, or wheel prep being required for welding any tooth type to the new surface. The weld material (strip weld wire coil) or alloy steel blend used for the welding process is stronger and will last up to 4 to 10 times longer than any A-36 mild or low carbon steel plate that is typically used in the landfill and soil wheel compactor industry. Wheel bodies can be re-cladded multiple times to the point where a customer would not need to pay for the higher priced rebuilt exchange option requiring new outer drums. Customers could do this for the life expectancy of their machines which average 10 to 15 years on site. Because wrappers are currently replaced every 4 to 5 years on wheel sets, customers could get a better longer lasting product along with an average savings over the life of a machine of $22,000 to $33,000 on wrapper cost alone.

By utilizing the submerged arc strip welding/weld cladding process of the present invention, labor costs can be dramatically reduced, when strips are applied up to 3" wide and ¼" to ½" thick. These strips can be done in one or two radial passes and one or two wheel rotations with a single or two-head submerged arc welder, as compared to current industry standards for applying a strip of similar width/thickness around the O.D. of each edge, as use of existing techniques would require up to 3 passes two times around each inner and outer wheel edge O.D to get a ¼" thick pass and would require 12 passes around each wheel edge O.D. or 24 times around each wheel to get a finish that is ½" thick. The submerged arc strip welding/weld cladding process of the present invention may thus be employed to increase the thickness of the outer wrapper to ¾" thickness or greater, and preferably 1" thickness or greater.

Therefore, according to one embodiment of the invention, a method for reconditioning a compactor wheel of a compaction machine is provided. The method includes mounting a compactor wheel on a positioning system configured to provide one or more of angular adjustment, vertical and horizontal translation, and rotation of the compactor wheel, so as to position the compactor wheel in a desired position. The method also includes providing a welding system configured to perform a submerged arc strip welding operation on the compactor wheel and performing the submerged arc strip welding operation on at least one surface or edge of the compactor wheel to add weldable material thereto, so as to recondition the at least one surface or edge of the compactor wheel.

According to another embodiment of the invention, a wheel of a compaction machine is reconditioned by a process that includes the steps of mounting a compactor wheel, providing a welding system configured to perform a weld cladding operation on the compactor wheel, and performing the weld cladding operation, via the welding system, on at least one surface or edge of the compactor wheel to one or more strips of weldable material thereto, so as to recondition the at least one surface or edge of the compactor wheel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for reconditioning a compactor wheel of a compaction machine, the method comprising:
   mounting a compactor wheel on a positioning system configured to provide one or more of angular adjustment, vertical and horizontal translation, and rotation of the compactor wheel, so as to position the compactor wheel in a desired position;
   providing a welding system configured to perform a submerged arc welding operation on the compactor wheel; and
   performing the submerged arc welding operation on at least one surface or edge of the compactor wheel to add weldable material thereto, so as to recondition the at least one surface or edge of the compactor wheel.

2. The method of claim 1 wherein the at least one surface or edge of the compactor wheel comprises an outer wrapper of the compactor wheel that includes inner and outer edges.

3. The method of claim 2 wherein performing the submerged arc welding operation comprises depositing an electroslag weld strip on the outer wrapper via the submerged arc strip welding operation, so as to recondition the outer wrapper.

4. The method of claim 3 wherein the electroslag weld strip is deposited onto the outer wrapper done in one radial pass and one wheel rotation, about an entire outer circumference of the outer wrapper.

5. The method of claim 4 wherein the electroslag weld strip is deposited onto the outer wrapper in an area between rows of cleat pads affixed to the outer wrapper.

6. The method of claim 4 wherein the electroslag weld strip is deposited onto the outer wrapper at one or more of the inner and outer edges thereof.

7. The method of claim 6 further comprising depositing a hard-surfacing abrasion resistant weld material along a top surface of the one or more of the inner and outer edges of the outer wrapper via the submerged arc strip welding operation.

8. The method of claim 3 wherein the electroslag weld strip comprises a 3" wide ¼" thick strip.

9. The method of claim 3 wherein the electroslag weld strip is composed of a steel matrix material.

10. The method of claim 3 wherein depositing the electroslag weld strip on the outer wrapper increases the thickness of the outer wrapper to ¾" or greater.

11. The method of claim 3 wherein the reconditioned outer wrapper presents a finished surface for which no grinding, sandblasting or wheel prep is required prior to welding cleat pads thereto.

12. The method of claim 1 wherein the at least one surface or edge of the compactor wheel comprises an inner sidewall and/or bolt cylinder extension of the compactor wheel.

13. A compactor wheel of a compaction machine reconditioned by a process comprising the steps of:
   mounting a compactor wheel;
   providing a welding system configured to perform a weld cladding operation on the compactor wheel; and
   performing the weld cladding operation, via the welding system, on at least one surface or edge of the compactor wheel, so as to recondition the at least one surface or edge of the compactor wheel.

14. The compactor wheel of claim 13 wherein the process further comprises performing one or more of angular adjustment, vertical and horizontal translation, and rotation of the compactor wheel via a positioning system on which the compactor wheel is mounted, so as to position the compactor wheel in a desired position.

15. The compactor wheel of claim 13 wherein the process further comprises weld cladding strips of weldable material onto an outer wrapper of the compactor wheel in one radial pass and one wheel rotation, about an entire outer circumference of the outer wrapper.

16. The compactor wheel of claim 15 wherein the process further comprises weld cladding the strips of weldable material onto the outer wrapper of the compactor wheel in an area between rows of cleat pads affixed to the outer wrapper.

17. The compactor wheel of claim 13 wherein the process further comprises weld cladding a hard-surfacing abrasion resistant weld material along a top surface of one or more of inner and outer edges of the outer wrapper.

18. The compactor wheel of claim 15 wherein the process further comprises performing the weld cladding operation to deposit strips of weldable material onto the outer wrapper and onto one another until the thickness of the outer wrapper is increased to ¾" or greater.

19. The compactor wheel of claim 18 wherein the strips of weldable material are composed of a stainless steel matrix, chrome nickel molybdenum, or a tungsten carbide impregnated material.

20. The compactor wheel of claim 18 wherein the strips of weldable material comprise a 3" wide ¼" thick strip.

* * * * *